US006607704B2

(12) United States Patent
Guttridge et al.

(10) Patent No.: US 6,607,704 B2
(45) Date of Patent: Aug. 19, 2003

(54) SULFUR TOLERANT LEAN $NO_x$ TRAP

(75) Inventors: Diane L. Guttridge, Grosse Ile, MI (US); Jun (John) Li, Canton, MI (US); Mohinder Singh Chattha, Northville, MI (US); Robert J. Kudla, Canton, MI (US); William Lewis Henderson Watkins, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 09/682,781

(22) Filed: Oct. 18, 2001

(65) Prior Publication Data

US 2003/0077218 A1 Apr. 24, 2003

(51) Int. Cl.[7] .......................... B01J 20/04; B01D 53/60; B01D 53/92
(52) U.S. Cl. .................. 423/213.2; 423/244.01; 423/244.02; 423/244.06; 423/244.07; 423/244.09; 423/244.1; 502/304; 502/341; 502/349; 502/400; 502/414; 502/524
(58) Field of Search ............... 423/213.2, 213.5, 423/239.1, 244.01, 244.02, 244.06, 244.07, 244.09, 244.1; 502/325, 328, 330, 400, 415, 524, 304, 341, 349, 414

(56) References Cited

U.S. PATENT DOCUMENTS

| 3,429,656 A | | 2/1969 | Taylor et al. ..................... 23/2 |
| 3,974,255 A | * | 8/1976 | Erickson et al. ............. 423/212 |
| 4,049,582 A | | 9/1977 | Erickson et al. ....... 252/466 PT |
| 4,172,810 A | | 10/1979 | Mitchell, III et al. ........ 252/465 |
| 4,239,656 A | | 12/1980 | Fujitani et al. .............. 252/462 |
| 4,261,862 A | | 4/1981 | Kinoshita et al. ........... 252/462 |
| 4,274,981 A | * | 6/1981 | Suzuki et al. ............... 252/438 |
| 4,316,822 A | * | 2/1982 | Fujitani et al. .............. 252/462 |
| 4,469,589 A | | 9/1984 | Yoo et al. .................... 208/120 |
| 4,472,267 A | | 9/1984 | Yoo et al. .................... 208/120 |
| 4,830,840 A | * | 5/1989 | Bhattacharyya ............. 423/239 |
| 4,883,783 A | | 11/1989 | Burk, Jr. et al. ............. 502/304 |
| 4,904,627 A | * | 2/1990 | Bhattacharyya ............... 502/63 |
| 4,985,387 A | | 1/1991 | Prigent et al. ............... 502/304 |
| 5,158,753 A | | 10/1992 | Take et al. .................... 422/173 |
| 5,258,347 A | * | 11/1993 | Khazai et al. ............... 502/306 |
| 5,283,055 A | | 2/1994 | Luck ........................ 423/239.1 |
| 5,758,489 A | | 6/1998 | Hepburn et al. .............. 60/274 |
| 5,876,681 A | | 3/1999 | Barthe et al. ............. 423/237.1 |
| 5,916,129 A | | 6/1999 | Modica et al. ................. 60/274 |
| 6,025,297 A | * | 2/2000 | Ogura et al. ................. 502/300 |
| 6,046,130 A | * | 4/2000 | Narbeshuber et al. ....... 502/340 |
| 6,153,162 A | * | 11/2000 | Fetzer et al. ............. 423/239.1 |
| 6,338,831 B1 | * | 1/2002 | Strehlau et al. ........ 423/244.07 |
| 6,350,421 B1 | * | 2/2002 | Strehlau et al. .......... 423/213.2 |

FOREIGN PATENT DOCUMENTS

| EP | 0 645 171 A1 | 3/1995 |
| EP | 0 945 165 A2 | 9/1999 |
| EP | 0 982 066 A1 | 3/2000 |

* cited by examiner

*Primary Examiner*—Stanley S. Silverman
*Assistant Examiner*—Timothy C. Vanoy
(74) *Attorney, Agent, or Firm*—Damian Porcari

(57) ABSTRACT

An integrated lean $NO_x$ trap. The integrated lean $NO_x$ trap includes a lean $NO_x$ trap containing a composite metal oxide mixture consisting essentially of about 80–100 wt % stoichiometric spinel $MgAl_2O_4$ and between about 0–20 wt % of $CeO_2$ or $CeO_2$—$ZrO_2$. A method for removing $NO_x$ and $SO_x$ impurities from exhaust gases using the integrated lean $NO_x$ trap is also described.

13 Claims, 6 Drawing Sheets

SULFUR TOLERANT LEAN NO$_X$ TRAP

BACKGROUND OF INVENTION

The present invention relates to a composition and method for controlling exhaust emissions, especially nitrogen oxides emissions, from combustion engines. More specifically, the present invention relates to a series of composite metal oxides that significantly improve the sulfur tolerance of a Lean NO$_x$ Trap (LNT).

An approach for treating the NO$_x$ emissions from lean-burn engines is the use of NO$_x$ traps. A LNT typically contains precious metals, alkali or alkali earth metals, and alumina. A generally accepted pathway for reactions of LNT is that under lean conditions, NO is oxidized to NO$_2$, which is followed by subsequent formation of a nitrate with alkali or alkali earth metal(s), e.g. Barium. Under stoichiometric or rich operation, the stored nitrate is thermodynamically unstable. The stored NO$_x$ is released. The NO$_x$ then catalytically reacts with reducing species in the exhaust gas to form N$_2$.

The alkali or alkali earth metal(s) that are typically used for NO$_x$ sorption are readily poisoned by sulfur oxides in the exhaust gas. Over time, the sulfur oxides react with these trapping elements forming sulfates which are more stable than corresponding nitrates. The present invention provides a new series of composite metal oxides that, combined with the active components of a LNT, significantly improve the sulfur tolerance of the LNT while maintaining or improving the other performances of the LNT.

SUMMARY OF INVENTION

The present invention solves this problem by providing a composition and method for storing and reducing NO$_x$ from lean burn internal combustion engines. The present invention uses composite metal oxides, in spinel structure, in conjunction with a typical LNT formulation to form an integrated LNT. The composite metal oxides in spinel structure act primarily as a SO$_x$ trapping element and also a secondary NO$_x$ trapping element within the integrated LNT. In the application of this integrated LNT, the sulfur oxides are mainly attached to the composite metal oxides in spinel structure under a relatively low temperature (200 to 600° C.). When the integrated LNT is saturated with sulfur for a specified NO$_x$ conversion, the LNT will be desulfated under rich condition at a higher temperature (600 to 750° C.), so that the capacity of the LNT for NO$_x$ trapping and conversion is regenerated. In this integrated LNT, the sulfur is trapped and released in a way that does not allow the sulfur to go to the primary NO$_x$ trapping element, i.e. the alkali or alkali earth metal oxides, to poison the integrated LNT; thereby, leaving more reactive sites for the NO$_x$ trapping and conversion.

The present invention provides a composition and method comprising a typical LNT formulation treated with a composite metal oxide in spinel structure. In one embodiment, the composite metal oxide spinel is in powder form and made into a slurry then coated into an LNT after all the other materials have been coated. Then the LNT is dried and calcined. In another embodiment, the spinel oxide slurry is mixed with CeO$_2$ powder in an amount of 4–15 (wt) % of CeO$_2$ of the total mixture before coating onto the LNT. In yet another embodiment, the spinel oxide slurry is mixed with CeO$_2$—ZrO$_2$ powder, in an amount of 4–15 (wt) % of the total mixture before coating onto the LNT.

The method for removing NO$_x$ and SO$_x$ impurities from exhaust gases provides a composition comprising an integrated LNT treated with a composite metal oxide having the spinel structure (AB$_2$O$_4$), and passing exhaust gas containing NO$_x$ and SO$_x$ over the composition. The NO$_x$ is stored under lean condition between 200 to 600° C. and released and converted under stoichiometric and rich condition between 200 to 600° C. Meanwhile, SO$_x$ is stored between 200 to 600° C. under both lean and rich conditions and is desulfated at a temperature between 600 to 750° C. under rich condition, when the trapped sulfur oxides have saturated the composite metal oxides and have thus reduced the NO$_x$ trapping efficiency to a predetermined value.

BRIEF DESCRIPTION OF DRAWINGS

FIG. 1 shows the NO$_x$ trapping performance of LNT A treated with and without 4 (wt) % of composite metal oxide MgAl$_2$O$_4$.

FIG. 2 shows the NOx trapping performance of LNT B treated with and without the 4 (wt) % MgAl$_2$O$_4$—CeO$_2$ mixture.

DETAILED DESCRIPTION

Figure 1A:
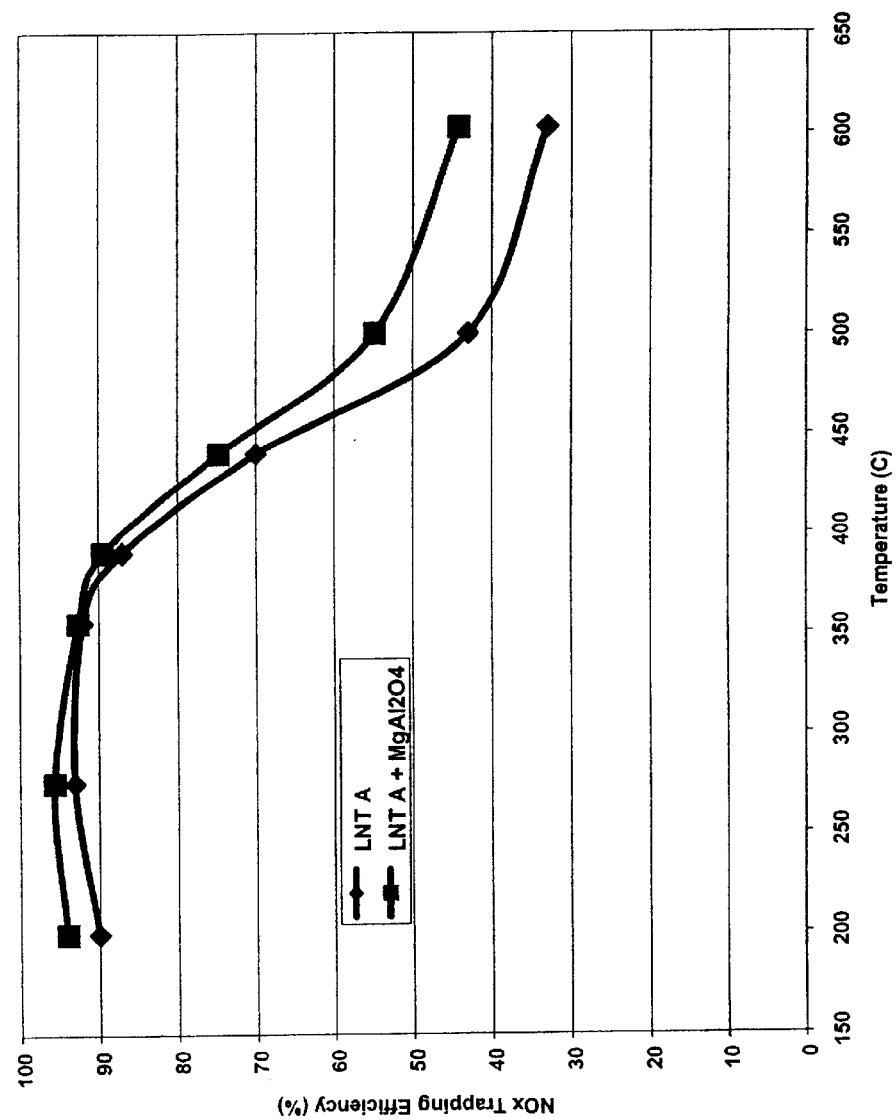
FIG. 1a shows the temperature window of LNT A with MgAl$_2$O$_4$ and without MgAl$_2$O$_4$.

The present invention teaches a series of composite metal oxides and a method to inhibit sulfur poisoning of lean NO$_x$ traps. A typical LNT can be doped with the current composite metal oxides, that are spinel in structure. These spinel oxides can also be added during the manufacturing of the typical LNT to form integrated new LNTs. The integrated new LNTs have significantly better sulfur tolerance than a LNT without the composite metal oxides. The composite metal oxide is made to be primarily a sulfur trapping element and also a secondary NO$_x$ trapping element within the integrated LNT.

As stated in the Background, a LNT trap typically contains precious metals, alkali or alkali earth metals, and alumina. A generally accepted pathway for reactions of LNT is that, under lean conditions, NO is oxidized to NO$_2$, which is followed by subsequent formation of a nitrate with alkali or alkali earth metal(s), e.g. Barium. Thus, the alkali or alkali earth metal(s) "trap" the NO$_x$. The trapped nitrate is decomposed, or released, into NO$_x$ under stoichiometric and rich conditions. This NO$_x$ is then reacted with reductants such as HC, CO, and H$_2$ to form N$_2$, CO$_2$, and H$_2$O. While the primary trapping elements are the alkali or alkali earth metals, the secondary trapping element is the composite metal oxide. The combination of the primary and secondary trapping elements, in conjunction with the precious metal, forms the sulfur tolerant integrated LNT.

The temperature for NO$_x$ trapping is around 200–600° C., with optimum performance at around 350 400° C. The wider the temperature range or window, the more versatile the trap and therefore easier to be put on a vehicle.

The composite spinel metal oxides in the integrated LNT can trap the sulfur under both lean and rich conditions between 200–600° C. Once the spinel is saturated with attached sulfur so that the $NO_x$ trapping efficiency is reduced to a specified value, e.g. 85%, then the LNT needs to be desulfated. This can be done by adjusting the exhaust to a rich condition, such as A/F=814, and raising the LNT temperature to about 600–750 ° C. for a short period of time, e.g. 15 minutes. The desulfated LNT will then have regenerated high $NO_x$ trapping efficiency.

The composite metal oxide is, for example, a stoichiometric spinel $MgAl_2O_4$, or a spinel $MgAl_2O_4$ having MgO on the surface ($MgAl_2O_4 \cdot MgO$), or a solid solution of stoichiometric spinel $MgAl_2O_4$ and excess MgO. It is believed that the spinel $MgAl_2O_4$ and/or the MgO on the surface of the composite metal oxide or in the solid solution forms a chemical bond with the absorbed $SO_x$, forming surface sulfate and bulk complex sulfate with the composite metal oxides. Therefore, the primary $NO_x$ trapping element within the LNT is protected for $NO_x$ trapping. The sulfur tolerance of the LNT is thus improved. On the other hand, we found that surface sulfates and bulk complex sulfates are easier to remove under reducing conditions than those bulk sulfates formed with the primary $NO_x$ trapping element, in the case that no spinel oxides are included in the LNT. From these results, it is believed the desulfation of the integrated LNT with composite spinel metal oxides is also easier than the typical LNTs.

The composite metal oxide is in powder form. The powder is then made into a slurry in an amount between about 2–30 (wt) % of the total trap. Preferably, the powder is made into a slurry in an amount between about 2–20 (wt) % of the total trap. Most preferably, the powder is made into a slurry in an amount between about 5–15 (wt) % of the total trap. The trap is then dipped into the slurry, dried at 120° C. in 6 hours, and calcined under 600° C. for 10 hours. The coating of the slurry can be conducted after all the other components are fixed or in the same time with the primary $NO_x$ trapping elements.

Another option is to mix spinel oxide with $CeO_2$ powder in an amount between about 0–20 (wt) % of $CeO_2$ of the total mixture. Preferably, the $CeO_2$ powder is mixed in an amount between about 2–15 (wt) % of the total mixture. Most preferably, the $CeO_2$ powder is mixed in an amount between about 4–10 (wt) % of the total mixture. The trap is then dipped into the slurry of spinel oxide with $CeO_2$, dried at 120° C. in 6 hours and calcined under 600° C. for 10 hours. Similarly, the coating of the slurry can be conducted after all the other components are fixed or in the same time with the primary $NO_x$ trapping elements. Using spinel/$CeO_2$ ($MgAl_2O_4 \cdot CeO_2$) provides better sulfur tolerance than using spinel alone. It is believed that $CeO_2$ promotes the oxidation of $SO_2$ through its surface and lattice oxygen thereby promoting the sulfur oxides oxidation and attachment to the spinels, thus improving the sulfur tolerance of the LNT.

Another option is to mix the oxide with $CeO_2$—$ZrO_2$ powder, in an amount between about 0–20 (wt) % of the total mixture. Preferably, the $CeO_2$—$ZrO_2$ powder is mixed in an amount between about 2–15 (wt) % of the total mixture. Most preferably, the $CeO_2$—$ZrO_2$ powder is mixed in an amount between about 4–10 (wt) % of the total mixture. The trap is then dipped into the slurry, dried at 120° C. in 6 hours and calcined under 600° C. for 10 hours. Again, the coating of the slurry can be conducted after all the other components are fixed or in the same time with the primary $NO_x$ trapping elements.

The method for removing $NO_x$ and $SO_x$ impurities from the exhaust gases involves adding a composite metal oxide in spinel structure to a typical LNT. The composite metal oxide is added in an amount between about 2–30 (wt) %. Preferably, the composite metal oxide is added in an amount between about 2–20 (wt) %. Most preferably, the composite metal oxide is added in an amount between about 5–15 (wt) %. The composite metal oxides are coated onto the typical LNT after all the other components are fixed or in the same time with the primary $NO_x$ trapping elements. The composite metal oxide is spinel in structure. The composite metal oxides are preferably $MgAl_2O_4$, $MgAl_2O_4 \cdot xMgO$, $MgAl_2O_4 \cdot yCeO_2$, or $MgAl_2O_4 \cdot zCeO_2$—$ZrO_2$, where x, y, and z are a number which would provide a correct wt % in accordance with the amount of composite metal oxides that is added to the total mixture. The LNT is doped with the composite metal oxide comprising between about 70–98 wt % LNT and about 2–30 wt % composite metal oxide.

The $SO_x$ impurities are mostly attached to the composite metal oxide in the form of surface sulfate and bulk composite sulfate at a temperature between 200 to 600° C. under lean and rich condition. The $SO_x$ impurities are released at a temperature between 600 to 750° C. under rich condition. For this integrated LNT with composite spine oxides, the storage and release conditions for $NO_x$ are similar to a typical $NO_x$ trap application condition. For example, the $NO_x$ is stored under lean condition (A/F>15) between 200–600° C., and then released and converted under stoichiometric and rich conditions (A/F<14.7) for a shorter period than the lean period between 200–600° C. This cycling continues and during these cycling, the sulfur are attached mainly to spinel oxides site. When the $NO_x$ efficiency is reduced to a predetermined value due to sulfur poisoning, the trap is ready for a desulfation cycle. The temperature of the trap is raised to about 600–750° C. under a rich condition, the sulfur attached to the spinel oxides is thus released, probably in the form of $H_2S$, and COS.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

EXAMPLE 1

For a preformed LNT, LNT A, a piece of LNT A is cut. 3 (wt) % of the total trap, of the stoichiometric spinel $MgAl_2O_4$ is made into a slurry. LNT A piece is dipped into the slurry and dried at 120° C. for 6 hours. Then it is calcined in the oven at 600° C. for 12 hours. A core of the integrated LNT (LNT A doped with spinel) with ¾" in diameter and 1" in length was tested in a flow reactor. The feed gas contains 500 pm NO, 50 ppm hydrocarbons, 10% $CO_2$, and 10% $H_2O$. The feed gas also contains 6% $O_2$ under lean conditions. When the feed gas is switched to rich condition, the $O_2$ is replaced with a 1% CO/3300 ppm $H_2$ mixture. The gas space velocity during this evaluation is 30,0001/hr. The LNT is run under a lean to rich cycle of 5 minutes lean and 3 minutes rich at 360° C.

For the sulfur tolerance test 9 ppm $SO_2$ is added in the feed gas described above then the sample is tested under this new feed gas at 360° C. for 40 hours.

After sulfur poisoning test, the integrated LNT is switched for a desulfation test. Here, the inlet gas temperature is raised to 625° C., under $N_2$ flow. Then, the feed gas composition is switched to the rich feed gas as described above. (No $SO_2$ is in the feed gas) After 5 minutes, the LNT is cooled down gradually under $N_2$ flow. The LNT is then tested at 360° C. under 5 minutes lean and 3 minutes rich cycle, as described above, for $NO_x$ trapping efficiency. This procedure is repeated for desulfation temperatures of 650°, 675°, 700°, 725°, 750° C.

Figure 1B:
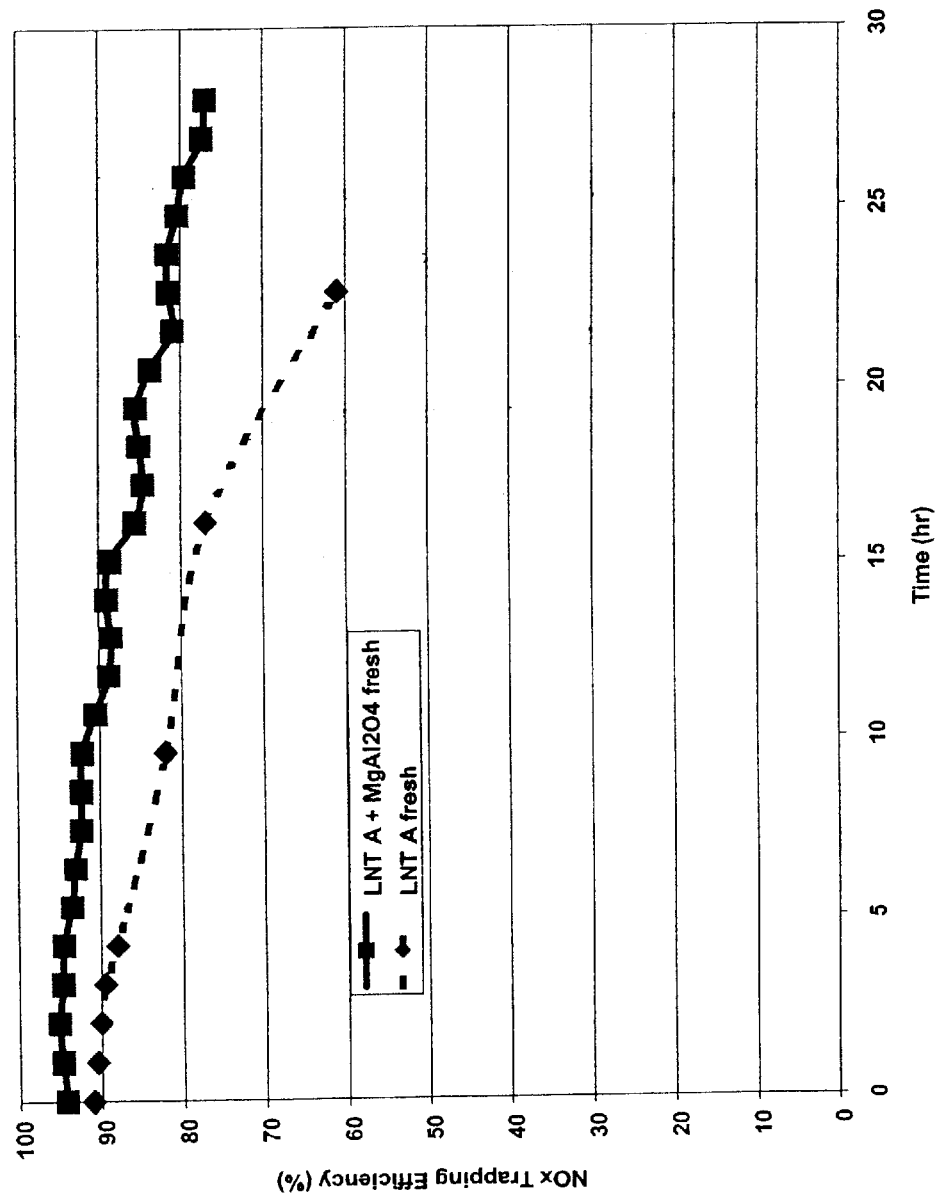
FIG. 1b shows the sulfur tolerance of LNT A with MgAl$_2$O$_4$ and without MgAl$_2$O$_4$.
Figure 1C:
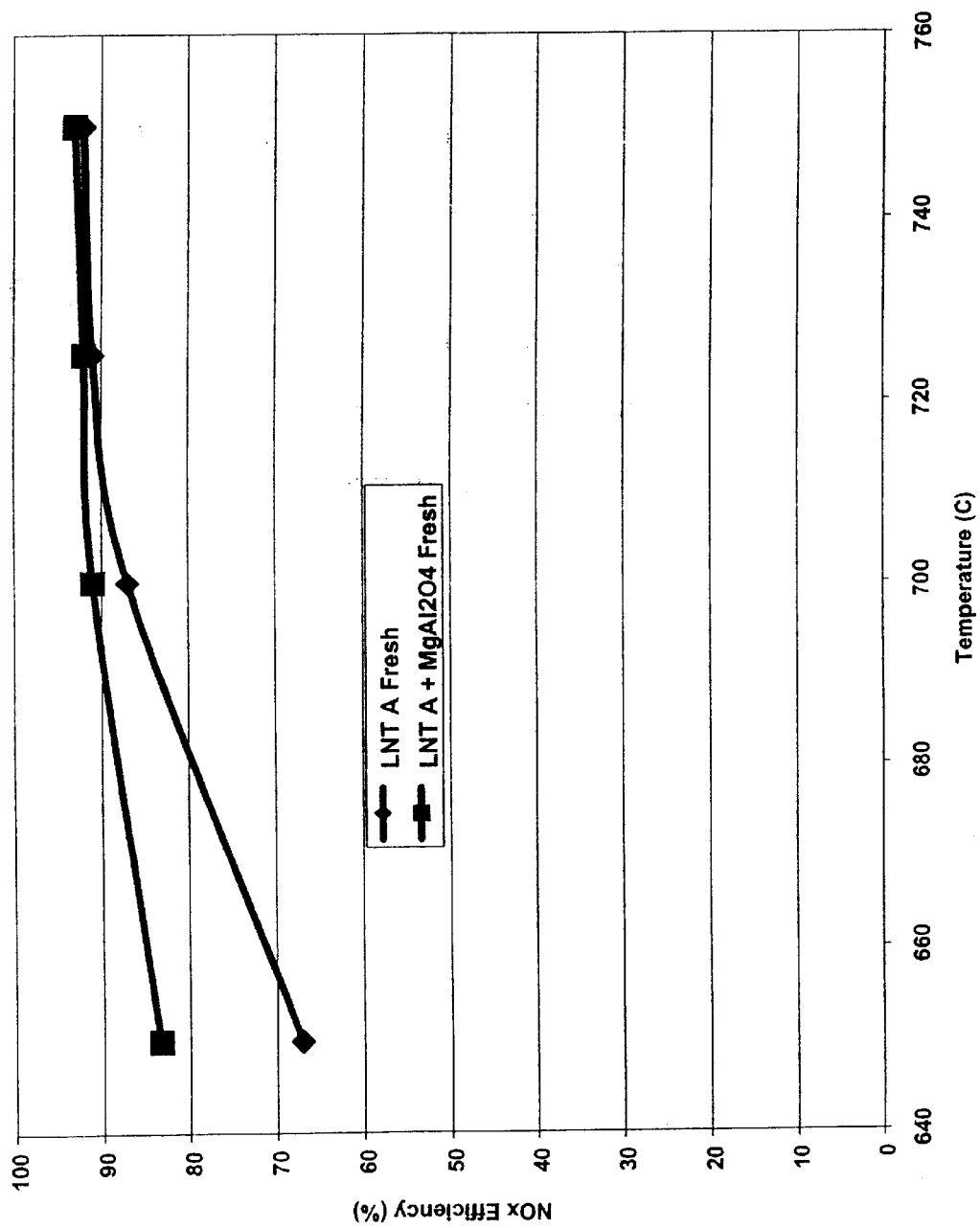
FIG. 1c shows the desulfation performance of LNT A with MgAl$_2$O$_4$ and without

Referring to the figures, FIG. 1 a shows the temperature profile of LNT A with $MgAl_2O_4$ and without $MgAl_2O_4$. FIG. 1b shows the LNT A sulfur tolerance with $MgAl_2O_4$ and without $MgAl_2O_4$. FIG. 1 c shows the LNT A desulfation with $MgAl_2O_4$ and without $MgAl_2O_4$. As can be seen from FIG. 1, the addition of spinel oxides expanded the temperature window slightly. The sulfur tolerance of the LNT A is significantly improved. The desulfation characteristics were also improved. As can be seen, the desulfation temperature to reach a specified $NO_x$ conversion is lower with the addition of the spinel oxides then that without the spinel oxides.

EXAMPLE 2

For a preformed LNT, LNT B, a piece of LNT B is cut. 90 (wt) % of the stoichiometric spinel $MgAl_2O_4$ is mixed with 10 (wt) % of $CeO_2$. 4 (wt) % of the total LNT B of the mixture is then made into a slurry. The LNT B piece is dipped into the slurry and dried at 120° C. for 6 hours. Then it is calcined in the oven at 600° C. for 12 hours. A core of the integrated LNT (LNT B doped with spinel) with ¾" in diameter and 1" in length is tested in a flow reactor. The formed LNT B is tested under the same conditions as described in Example 1.

Figure 2A:
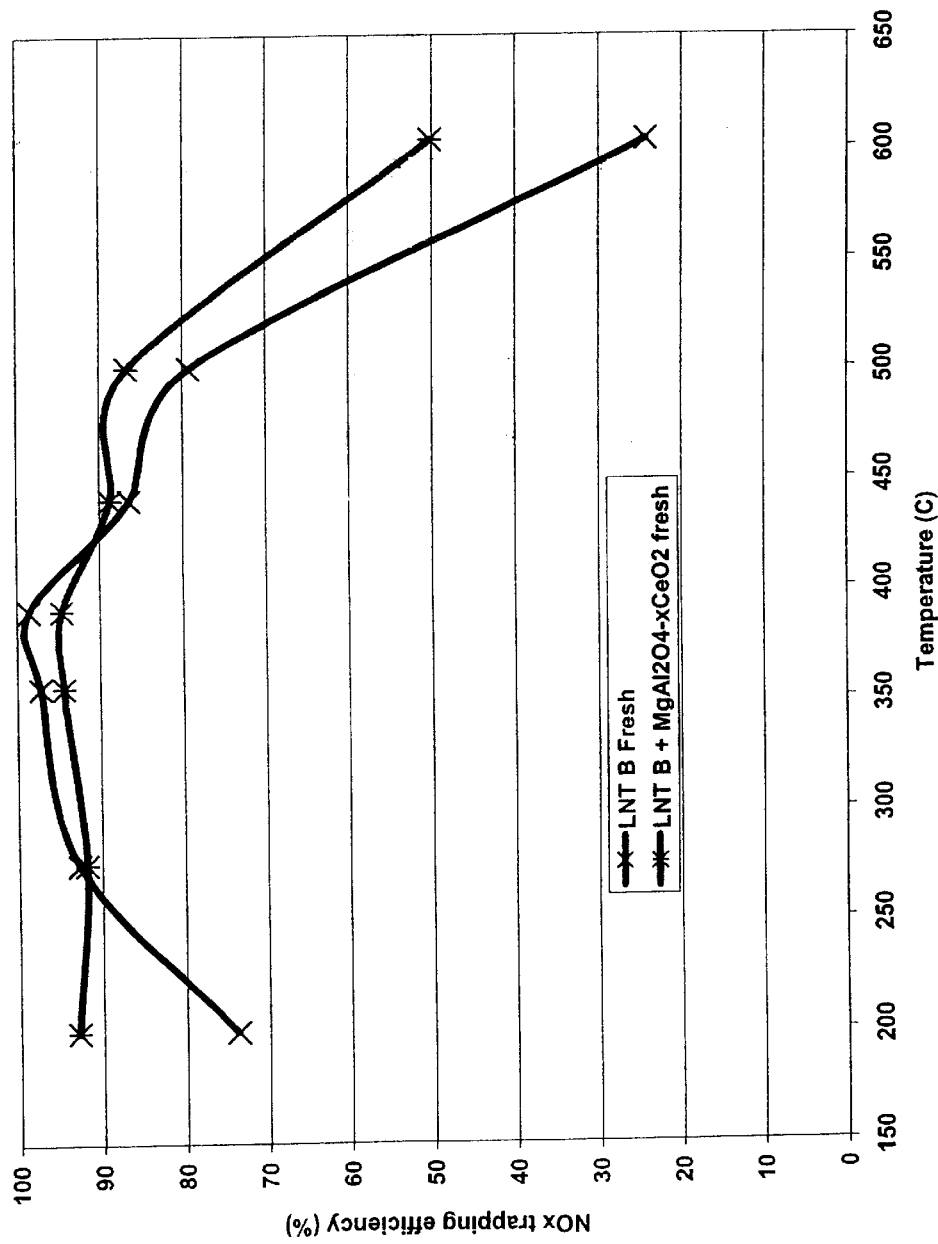
FIG. 2a shows the temperature window of LNT B with MgAl$_2$O$_4$.CeO$_2$ and without MgAl$_2$O$_4$.CeO$_2$.
Figure 2B:
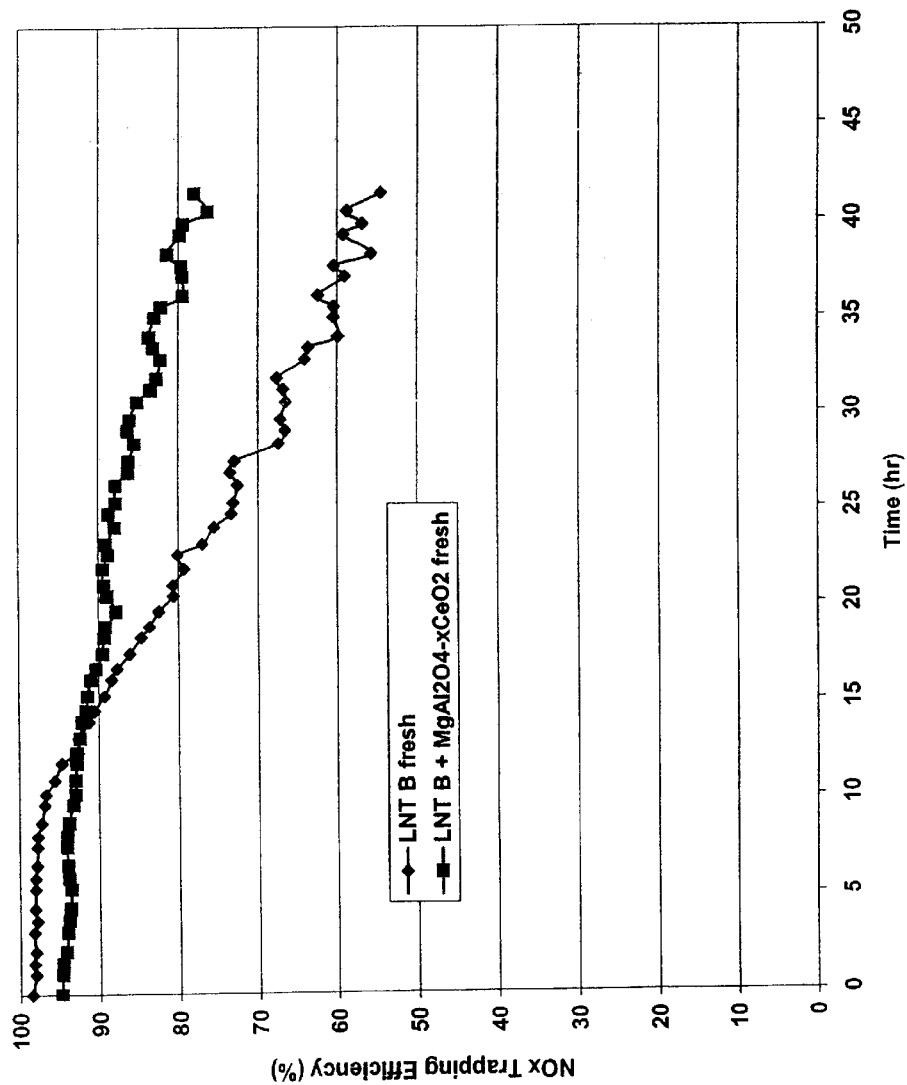
FIG. 2b shows the sulfur tolerance of LNT B with MgAl$_2$O$_4$.CeO$_2$ and without MgAl$_2$O$_4$.CeO$_2$.
Figure 2C:
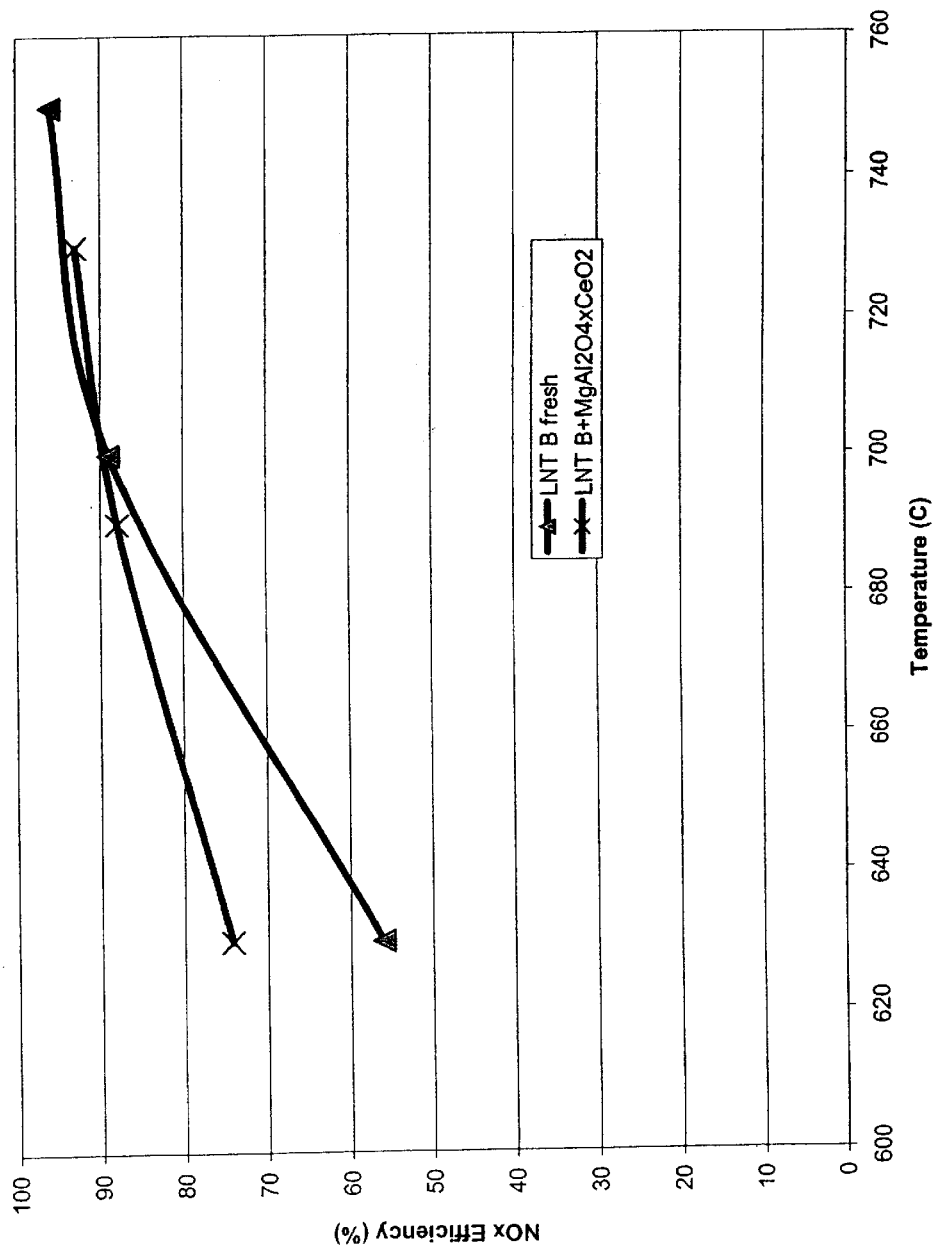
FIG. 2c shows the desulfation performance of LNT B with MgAl$_2$O$_4$.CeO$_2$ and without MgAl$_2$O$_4$.CeO$_2$.

FIG. 2a shows the LNT B temperature window with $MgAl_2O_4.CeO_2$ and without $MgAl_2O_4$. $CeO_2$. FIG. 2b shows the LNT B sulfur tolerance with $MgAl_2O_4.CeO_2$ and without $MgAl_2O_4.CeO_2$. FIG. 2c shows the LNT B desulfation with $MgAl_2O_4$. $CeO_2$ and without $MgAl_2O_4.CeO_2$. As can be seen, the temperature window is widened slightly. The sulfur tolerance is improved significantly. The desulfation temperature is lower than without the addition of $MgAl_2O_4.CeO_2$.

What is claimed is:

1. An integrated lean $NO_x$ trap consisting essentially of:
   about 70 to 98 wt. % of a lean $NO_x$ trap; and
   about 2 to 30 wt. % of a composite metal oxide mixture consisting essentially of about 80–100 wt % stoichiometric spinel $MgAl_2O_4$ and between about 0–20 wt % of $CeO_2$ or $CeO_2$—$ZrO_2$.

2. The integrated lean $NO_x$ trap of claim 1 wherein the integrated lean $NO_x$ trap comprises between about 80–98 wt % lean $NO_x$ trap and between about 2–20 wt % of the composite metal oxide mixture.

3. The integrated lean $NO_x$ trap of claim 1 wherein the integrated lean $NO_x$ trap comprises between about 85–95 wt % lean $NO_x$ trap and between about 5–15 wt % of the composite metal oxide mixture.

4. The integrated lean $NO_x$ trap of claim 1 wherein the composite metal oxide mixture consists essentially of between about 85–98 wt % stoichiometric spinel $MgAl_2O_4$ and between about 2–15 wt % of $CeO_2$ or $CeO_2$—$ZrO_2$.

5. The integrated lean $NO_x$ trap of claim 1 wherein the composite metal oxide mixture consists essentially of between about 90–96 wt % stoichiometric spinel $MgAl_2O_4$ and between about 4–10 wt % of $CeO_2$ or $CeO_2$—$ZrO_2$.

6. A method for removing $NO_x$ and $SO_x$ impurities from exhaust gases comprising:

a) providing an integrated lean $NO_x$ trap consisting essentially of a lean $NO_x$ trap and a composite metal oxide mixture consisting essentially of between about 80–100 wt % stoichiometric spinel $MgAl_2O_4$ and between about 0–20 wt % of $CeO_2$ or $CeO_2$—$ZrO_2$;

b) passing exhaust gas having an air/fuel ratio which is fuel-lean with respect to a stoichiometric air/fuel ratio over the integrated lean $NO_x$ trap whereby the integrated lean $NO_x$ trap absorbs $NO_x$ and $SO_x$ from the fuel-lean exhaust gas;

c) purging the $NO_x$ from the integrated lean $NO_x$ trap by subjecting the integrated lean $NO_x$ trap to exhaust gas having an air/fuel ratio which is the stoichiometric air/fuel ratio or which is fuel-rich with respect to the stoichiometric air/fuel ratio, and absorbing $SO_x$ from the stoichiometric or fuel-rich exhaust gas, wherein the $NO_x$ is purged from the integrated lean $NO_x$ trap and the $SO_x$ is absorbed by the integrated lean $NO_x$ trap at a temperature in the range of between about 200° C. to about 600° C.;

d) repeating steps b) and c) until the $NO_x$ absorption efficiency of the lean $NO_x$ trap has been reduced to a predetermined level; and e) purging the $SO_x$ from the integrated lean $NO_x$ trap by subjecting the integrated lean $NO_x$ trap to exhaust gas having the air/fuel ratio which is fuel-rich with respect to the stoichiometric air/fuel ratio, wherein the $SO_x$ is purged at a temperature in the range of between about 600° C. to about 750° C.

7. The method of claim 6, wherein the $NO_x$ and $SO_x$ are absorbed at a temperature of between about 200 to about 600° C.

8. The method of claim 6 wherein the integrated lean $NO_x$ trap comprises between about 70–98 wt % lean $NO_x$ trap and between about 2–30 wt % of the composite metal oxide mixture.

9. The method of claim 6 wherein the integrated lean $NO_x$ trap comprises between about 80–98 wt % lean $NO_x$ trap and between about 2–20 wt % of the composite metal oxide mixture.

10. The method of claim 6 wherein the integrated lean $NO_x$ trap comprises between about 85–95 wt % lean $NO_x$ trap and between about 5–15 wt % of the composite metal oxide mixture.

11. The method of claim 6 wherein the composite metal oxide mixture consists essentially of between about 85–98 wt % stoichiometric spinel $MgAl_2O_4$ and between about 2–15 wt % of $CeO_2$ or $CeO_2$—$ZrO_2$.

12. The method of claim 6 wherein the composite metal oxide mixture consists essentially of between about 90–96 wt % stoichiometric spinel $MgAl_2O_4$ and between about 4–10 wt % of $CeO_2$ or $CeO_2$—$ZrO_2$.

13. The method of claim 6 wherein the predetermined level is 85%.

* * * * *